US012326927B2

(12) United States Patent
Chopra et al.

(10) Patent No.: US 12,326,927 B2
(45) Date of Patent: Jun. 10, 2025

(54) SYSTEM AND METHOD FOR AUTOMATIC ONBOARDING OF NETWORK FUNCTIONS TO A CREDENTIAL VAULT

(71) Applicant: Rakuten Symphony, Inc., Tokyo (JP)

(72) Inventors: Akashdeep Chopra, Tokyo (JP); Manish Kumar, Tokyo (JP); Ashish Madan, Singapore (SG)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 18/023,216

(22) PCT Filed: Dec. 21, 2022

(86) PCT No.: PCT/US2022/053676
§ 371 (c)(1),
(2) Date: Feb. 24, 2023

(87) PCT Pub. No.: WO2024/136860
PCT Pub. Date: Jun. 27, 2024

(65) Prior Publication Data
US 2025/0077638 A1 Mar. 6, 2025

(51) Int. Cl.
*G06F 21/44* (2013.01)
*H04L 9/32* (2006.01)

(52) U.S. Cl.
CPC ............ *G06F 21/44* (2013.01); *H04L 9/3213* (2013.01); *H04L 9/3247* (2013.01); *H04L 9/3263* (2013.01); *G06F 2221/2141* (2013.01)

(58) Field of Classification Search
CPC ............. G06F 21/44; G06F 2221/2141; H04L 9/3213; H04L 9/3247; H04L 9/3263
See application file for complete search history.

(56) References Cited

U.S. PATENT DOCUMENTS

| 2018/0027073 | A1  | 1/2018  | Kazi |
| 2018/0191581 | A1* | 7/2018  | Yu ........................ H04L 41/042 |
| 2018/0359100 | A1  | 12/2018 | Gaddam et al. |
| 2020/0007335 | A1* | 1/2020  | Tan ....................... H04L 9/3213 |
| 2020/0042731 | A1* | 2/2020  | Kim ...................... G06F 21/602 |

OTHER PUBLICATIONS

International Search Report dated Mar. 22, 2023, issued in International Application No. PCT/US2022/053676.
Written Opinion dated Mar. 22, 2023, issued in International Application No. PCT/US2022/053676.

* cited by examiner

*Primary Examiner* — Sangseok Park
(74) *Attorney, Agent, or Firm* — Sughrue Mion, PLLC

(57) ABSTRACT

To automatically onboard network functions to a credential vault, a orchestration processor actuates establishment of an cluster account for a network cluster, and actuates a cluster configuration of a processor of the vault to enable authentication of a network cluster. For each of a plurality of network functions associated with the network cluster, the orchestration processor generates an identifier, sets values for parameters of an initialization parameter set, actuates assignment of access permissions for a code address on a memory of the vault, actuates assignment of elevated access permissions for a credential address on the vault memory, and actuates association of the network function with a cluster account of the network cluster. The vault memory thereby defines credential addresses each corresponding to a respective network function.

18 Claims, 8 Drawing Sheets

SYSTEM AND METHOD FOR AUTOMATIC ONBOARDING OF NETWORK FUNCTIONS TO A CREDENTIAL VAULT

CROSS REFERENCE TO RELATED APPLICATIONS

This application is a National Stage of International Application No. PCT/US2022/053676 filed Dec. 21, 2022.

BACKGROUND

1. Field

Apparatuses and methods consistent with example embodiments relate to configuration of authentication features in a network, and more particularly, to the automatic onboarding of network functions to a credential vault and related components for later authentication of communications of the network functions.

2. Description of Related Art

A network infrastructure connects to outside devices using "network functions" or "network nodes": units which provide interfaces between the connecting devices and the network. These network functions (NFs) generally include communication ports or modules, one for connecting to individual devices and one for connecting to the network as a whole, and a processor for managing communications therebetween. NFs may be grouped into "clusters" of various levels of size to organize their operations.

For a network to operate both effectively and securely, it should not be possible for someone to randomly connect a new NF to the network. Instead, NFs may be "onboarded," a process in which systems within the network are provided with configuration data for each NF, and connection and security protocols are arranged.

SUMMARY

It is an object of the disclosed system and method to efficiently and automatically onboard an arbitrarily large number of network functions to a credential vault.

In accordance with certain embodiments of the present disclosure, a method is provided for onboarding of network functions to a credential vault. The credential vault includes a vault memory and a vault processor, and the vault memory stores an authentication code at a code address thereof. The method operates by at least one processor and includes actuating the establishment of an cluster account for a network cluster. The method further includes actuating a cluster configuration of the vault processor to enable authentication of the network cluster. The method further includes, for each of a plurality of network functions associated with the cluster, generating an identifier for the network function, setting values for parameters of an initialization parameter set for the network function, actuating assignment of access permissions to the network function for the code address on the vault memory, actuating assignment of elevated access permissions to the network function for a credential address on the vault memory, and actuating association of the network function with the cluster account of the network cluster. The initialization parameter set includes the credential address in the vault memory for storage of a credential for the network function, and a value of the credential address is based on the generated identifier for the network function. The vault memory thereby defines a plurality of credential addresses each corresponding to a respective one of the plurality of network functions. The vault processor is configured to provide, based on receipt of a code retrieval request identifying the code address from a device having access permissions thereto, the authentication code. The vault processor is further configured to store at a selected credential address, based on receipt of a credential storage request providing a credential and identifying the selected credential address from a device having elevated access permissions thereto, the provided credential. The vault processor is further configured to provide, based on receipt of a credential retrieval request identifying the selected credential address from a device having elevated access permissions thereto, the credential stored at the selected credential address.

In accordance with other embodiments of the present disclosure, a non-transitory computer-readable recording medium is provided. The recording medium has recorded thereon instructions executable by at least one processor to perform a method for onboarding of network functions to a credential vault. The credential vault includes a vault memory and a vault processor, and the vault memory stores an authentication code at a code address thereof. The method operates by at least one processor and includes actuating the establishment of an cluster account for a network cluster. The method further includes actuating a cluster configuration of the vault processor to enable authentication of the network cluster. The method further includes, for each of a plurality of network functions associated with the cluster, generating an identifier for the network function, setting values for parameters of an initialization parameter set for the network function, actuating assignment of access permissions to the network function for the code address on the vault memory, actuating assignment of elevated access permissions to the network function for a credential address on the vault memory, and actuating association of the network function with the cluster account of the network cluster. The initialization parameter set includes the credential address in the vault memory for storage of a credential for the network function, and a value of the credential address is based on the generated identifier for the network function. The vault memory thereby defines a plurality of credential addresses each corresponding to a respective one of the plurality of network functions. The vault processor is configured to provide, based on receipt of a code retrieval request identifying the code address from a device having access permissions thereto, the authentication code. The vault processor is further configured to store at a selected credential address, based on receipt of a credential storage request providing a credential and identifying the selected credential address from a device having elevated access permissions thereto, the provided credential. The vault processor is further configured to provide, based on receipt of a credential retrieval request identifying the selected credential address from a device having elevated access permissions thereto, the credential stored at the selected credential address.

In accordance with still other embodiments of the present disclosure, a system for onboarding of network functions to a credential vault is provided. The system includes an orchestrator, which includes at least one orchestration processor. The system further includes a credential vault, which includes a vault memory and at least one vault processor. The vault memory stores an authentication code at a code address thereof. The at least one orchestration processor is configured to actuate establishment of an cluster account for a network cluster. The at least one orchestration processor is further configured to actuate a cluster configuration of the at least one vault processor to enable authentication of the network cluster. The at least one orchestration processor is further configured to, for each of a plurality of network functions associated with the network cluster, generate an identifier for the network function, set values for parameters of an initialization parameter set for the network function, actuate assignment of access permissions to the network function for the code address on the vault memory, actuate assignment of elevated access permissions to the network function for a credential address on the vault memory, and actuate association of the network function with the cluster account of the network cluster. The initialization parameter set includes the credential address in the vault memory for storage of a credential for the network function, and a value of the credential address is based on the generated identifier for the network function. The vault memory thereby defines a plurality of credential addresses each corresponding to a respective one of the plurality of network functions. The at least one vault processor is configured to provide, based on receipt of a code retrieval request identifying the code address from a device having access permissions thereto, the authentication code. The at least one vault processor is further configured to store at a selected credential address, based on receipt of a credential storage request providing a credential and identifying the selected credential address from a device having elevated access permissions thereto, the provided credential. The at least one vault processor is further configured to provide, based on receipt of a credential retrieval request identifying the selected credential address from a device having elevated access permissions thereto, the credential stored at the selected credential address.

Additional aspects will be set forth in part in the description that follows and, in part, will be apparent from the description, or may be realized by practice of the presented embodiments of the disclosure.

BRIEF DESCRIPTION OF THE DRAWINGS

Features, aspects and advantages of certain exemplary embodiments of the disclosure will be described below with reference to the accompanying drawings, in which like reference numerals denote like elements, and wherein.

DETAILED DESCRIPTION

Figure 1:
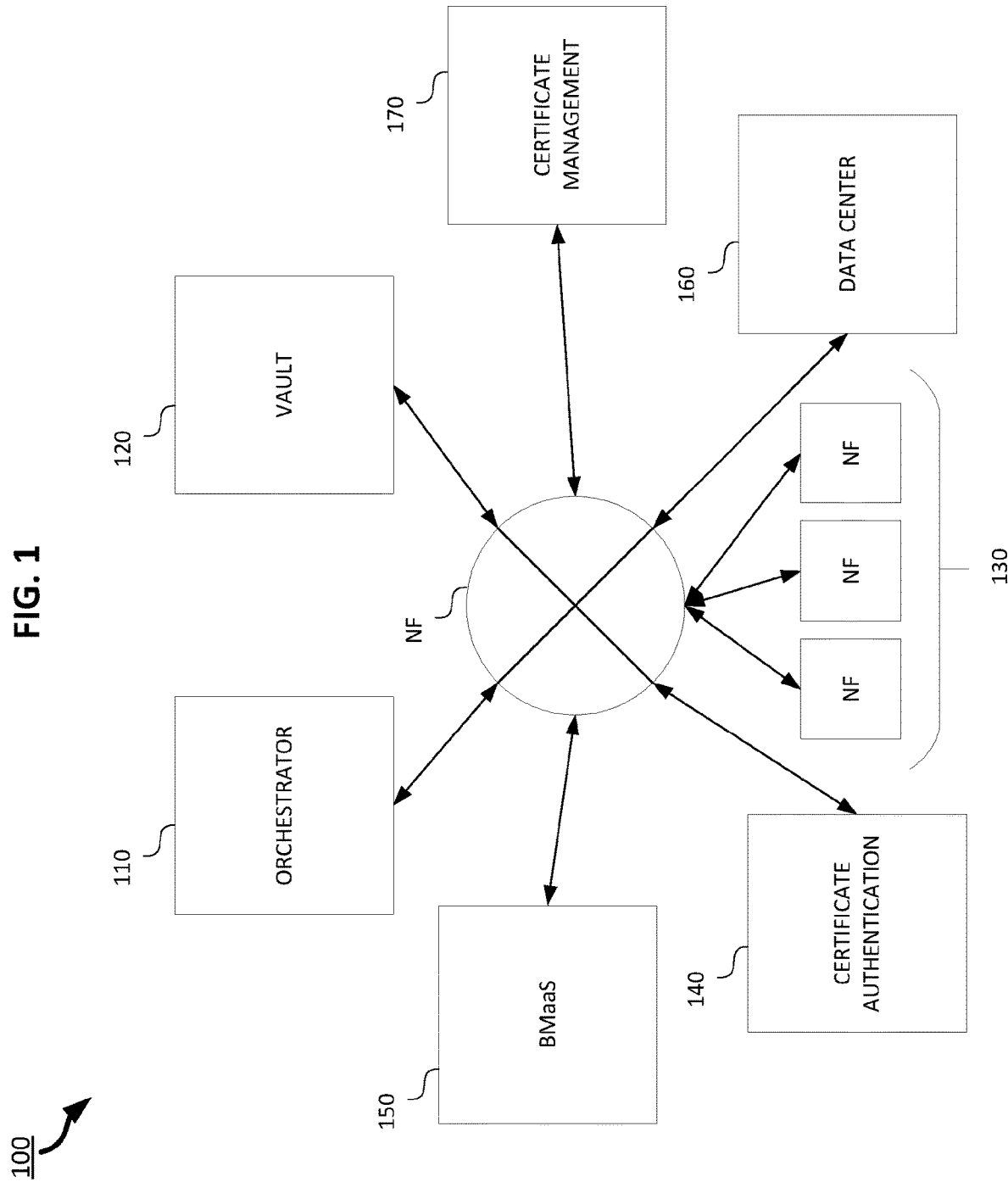
FIG. 1 is a block diagram illustrating a system for onboarding network functions to a credential vault, in accordance with an exemplary embodiment.

The following detailed description of example embodiments refers to the accompanying drawings. The same reference numbers in different drawings may identify the same or similar elements. The embodiments are described below in order to explain the disclosed system and method with reference to the figures illustratively shown in the drawings for certain exemplary embodiments for sample applications.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

It is noted that the principles disclosed herein are generally applicable to all forms of networks, including but not limited to internet service provider networks such as optical fiber and cable networks; traditional phone networks; and both wired and wireless networks in a structure, complex, or other localized area. However, throughout the disclosure, the network being managed by the disclosed system will be primarily referred to as a mobile network for convenience and clarity purposes.

The onboarding of a network function (NF) to a network may include securely storing security credentials of the NF, such as a network function certificate and/or a key value pair, in a memory of a "vault": a server on the network with persistent secure storage and authentication functionality. This is sometimes described as "onboarding the network function to the credential vault." The credential vault may be securely accessed to authenticate the communications of an onboarded NF.

Once the credentials are stored in the vault memory, a vault processor of the credential vault server may provide authentication functionality on the basis of the credentials, which may include providing the credentials on request when the correct protocols are followed. For example, a network function (NF) may request its own credentials, which it will use to authenticate a secure communication. This approach avoids storage of those credentials in the NF's own long-term memory, which may be preferable for security reasons as the NF memory may be more vulnerable to hacking or even physical access. As will be described further herein, various elements of the credentials and related authentication materials may be retrieved through different methods and with different "middlemen" subsystems to increase security.

The credentials of each NF may include a private key and a signed authentication certificate, each exclusive to the NF. The vault processor may also store a general authentication code, such as a hash-based message authentication code (HMAC). In an authentication system using such credentials, the NF uses the authentication code to authenticate itself to a certificate authority, and thereby enroll the authentication certificate with the authority. Later, when the NF needs to establish a secure connection with another system, it can retrieve the authentication certificate to secure its transmissions, and the other system can confirm with the certificate authority that the certificate identifies the NF as the source of the transmissions.

Preparation of the credentials for an NF and management of the onboarding may be handled manually by physical or remote access to the vault. However, when a large number of NFs are to be uploaded at once—for example, by the addition of one or more complete clusters to the network, or the configuration of a new vault for existing NFs—this can be impractical.

Embodiments of the disclosure are directed to an automated process for onboarding network functions to a credential vault, including generation of all credentials and other NF configuration aspects, and provision of the credentials to the vault and to other computing devices in a manner such that the system as a whole will be configured to authenticate each NF as needed.

FIG. 1 is a block diagram illustrating a system 100 for onboarding network functions to a credential vault, in accordance with an exemplary embodiment.

Each component of the system 100 may be communicatively coupled to the other components through a network NW.

The system 100 may include an orchestrator 110, a credential vault 120, and a plurality of network functions (NFs) 130 in need of onboarding to the credential vault 120.

The orchestrator 110 may be implemented on a computer. A processor of the orchestrator 110 may be configured to manage the onboarding of a plurality of NFs 130 to the credential vault 120. Details of this management according to certain embodiments will be described further herein.

A memory of the credential vault 120 may be configured to store credentials for NFs, specifically at a plurality of credential addresses which may be defined within, and also to store an authentication code at a code address defined within. A processor of the credential vault 120 may be configured to provide an authentication code stored at the code address upon receipt of a code retrieval request identifying the code address from a device having access permissions thereto, and may be configured to provide an NF credential stored at one of the credential addresses upon receipt of a credential retrieval request identifying the credential address from a device having elevated access permissions thereto.

The authentication code may be, for example, a hash-based message authentication code (HMAC), among other possibilities. The HMAC may be used to authenticate that messages originate from an authorized and onboarded network function, by measures described further herein. The NF credential may be a private key, a signed authentication certificate, or both, among other possibilities.

In certain embodiments, the system 100 may further include a certificate authentication server 140, a Bare-Metal-as-a-Service (BMaaS) server 150, a data center server 160, and a certificate management server 170.

A processor of the certificate authentication server 140 may generate a suitable authentication code corresponding to the certificate authentication server 140, and provide it to the credential vault 120 for storage at the code address of the vault memory.

The processor of the certificate authentication server 140 may also "sign" authentication certificates on authorized request, using suitable secure authentication methods. For example, the certificate authentication server 140 may have a public-private encryption key pair, and the private encryption key may not be available outside of the certificate authentication server 140. The certificate authentication server 140 may encrypt a copy of part or all of the certificate, using the private key, and attach the encrypted version to the original as the "signature." Another party may then use the corresponding public key to decrypt the signature, and if the decrypted signature matches to the appropriate portion of the rest of the certificate, it can be verified that the certificate was signed by the certificate authentication server 140 and is therefore authentic.

The BMaaS server 150 and the data center server 160 may provide an additional layer of security by organizing authentication through clusters; for example, the cluster organization found in Kubernetes®. The BMaaS server 150 may operate cluster accounts which the NF 130 may access through the data center server 160.

The certificate management server 170 may manage the generation, enrollment, and storage of new certificates and other credentials on behalf on an NF 130.

Figure 2A:
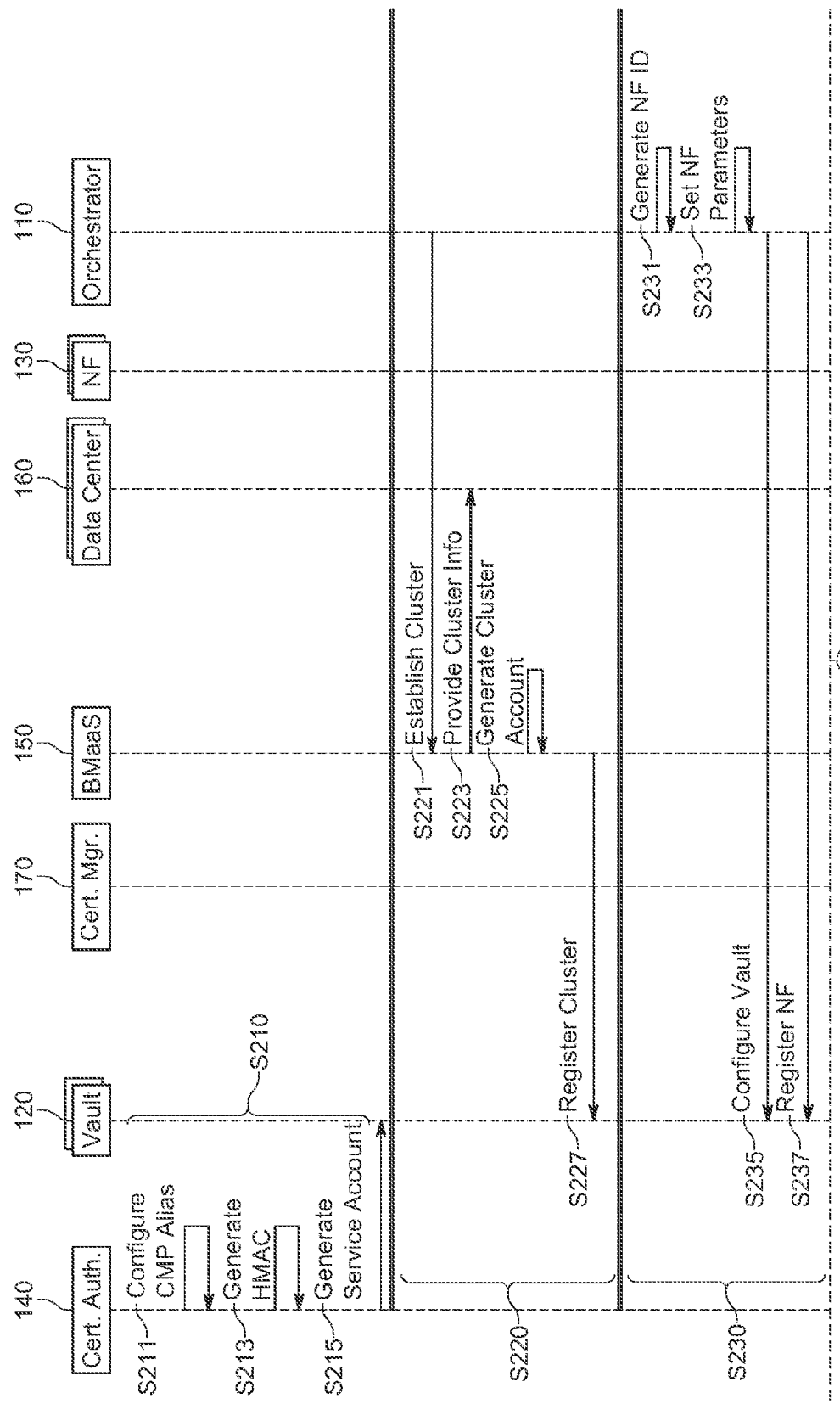
FIGS. 2A and 2B are sequence diagrams illustrating a process flow for onboarding network functions to a credential vault, in accordance with an exemplary embodiment.
Figure 2B:
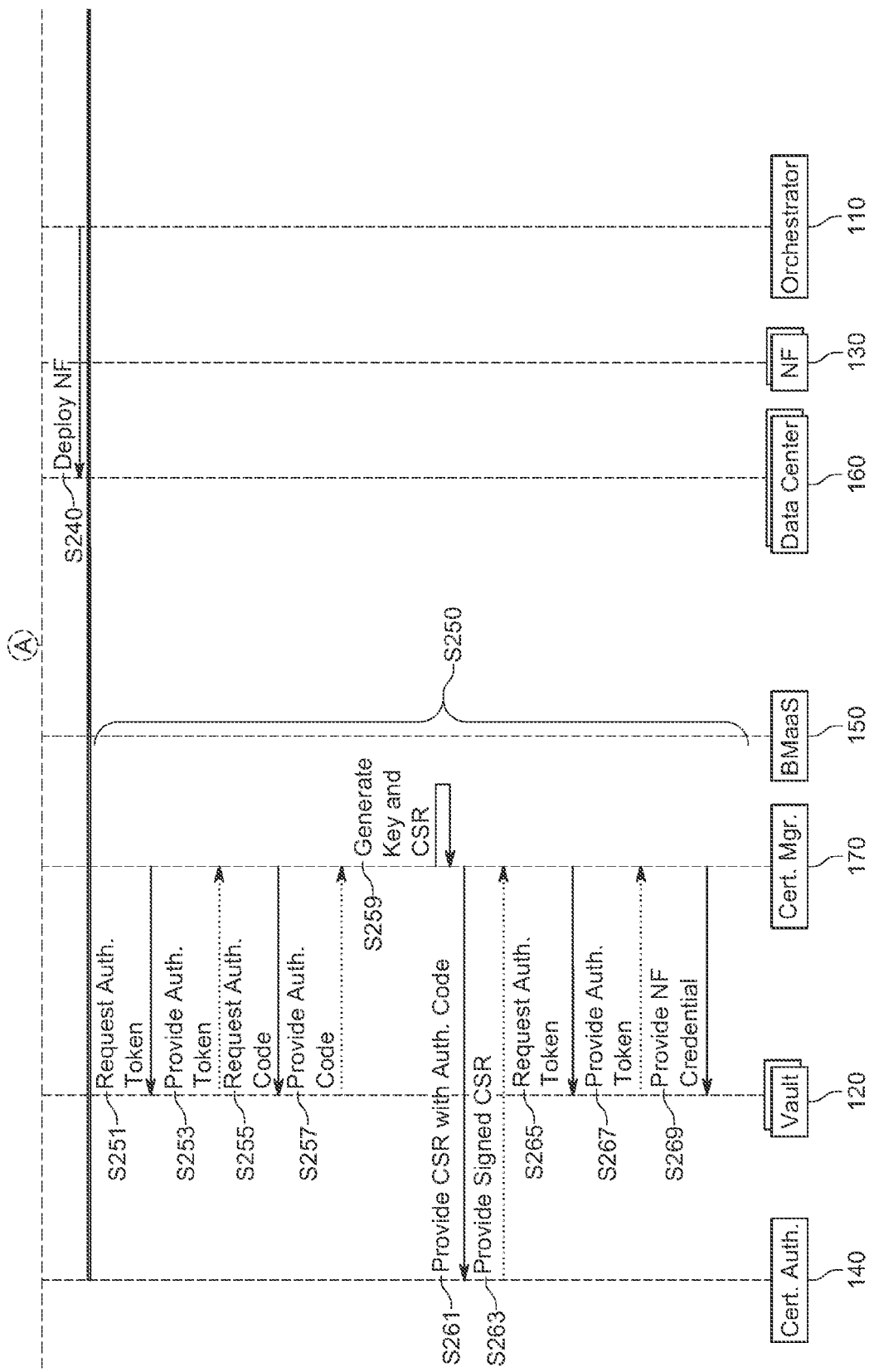

FIGS. 2A and 2B are sequence diagrams illustrating a process flow for onboarding network functions to a credential vault, in accordance with an exemplary embodiment.

The orchestrator may be, for example, the orchestrator 110 described with reference to FIG. 1. The vault may be, for example, the credential vault 120 described with reference to FIG. 1. The network functions (NFs) may be, for example, the NFs 130 described with reference to FIG. 1.

A certificate authority server may be enrolled to the vault at S210. The certificate authority server may be, for example, the certificate authority server 140 described with reference to FIG. 1.

Specifically, at S211, a certificate management profile alias (CMP Alias) may be configured on the certificate authority server. At S213, an authentication code—for example, a hash-based message authentication code (HMAC) may be generated, and at S215 the code may be transmitted to the vault for storage. The vault may have a specific address in the vault memory designated for storage of the authentication code, which may be termed the code address.

Operation S210 may be generally unnecessary if the vault and the certificate authority server are already properly configured with respect to each other. However, regular "renewal" enrollment to change the authentication code may be desired for security reasons, for example to prevent a compromised authentication code from being useful for more than a brief window. As such, operations S213 and S215 may be repeated on a regular cycle, such as hourly or daily, and some of these iterations may be concurrent with other operations of this and other methods. That is to say, the authentication code may be renewed on this regular cycle by the certificate authority server.

If the network operates on a cluster organization, a cluster may be generated and registered to the vault at S220. This operation may be repeated for a plurality of clusters. The cluster may be, for example, a Kubernetes® cluster.

Specifically, at S221, the orchestrator may actuate the establishment of a cluster organizational unit. Such units may be defined on a Bare-Metal-as-a-Service (BMaaS) server. The BMaaS server may be, for example, the BMaaS server 150 described with reference to FIG. 1.

The BMaaS server in turn may supply information describing the cluster to a data center, at S223. The BMaaS server may also generate a service account for the cluster on the data center server, at S225. This account will be used for the cluster, and by extension for the NFs organized within the cluster, to operate the services of the data center server. The data center server may be, for example, the data center server 160 described with reference to FIG. 1. An authentication token may be generated and associated with the cluster, such that an NF within the cluster which logs in to the cluster service account may retrieve the token to show its status as an NF within the cluster.

The BMaaS server may also generate a cluster identifier at S225.

The cluster identifier may be logically generated based on a schema. For example, the identifier may be a concatenation of alphanumeric codes each indicating a different feature of the cluster. Each of the code values may be determined by a predefined mapping of code value to feature value, by applying a function to the feature value, or by other suitable means. An illustrative example of a cluster identifier generation schema is depicted in FIG. 3A, although this is just an example and any suitable schema to generate an identifier unique to a specific cluster may be used.

Figure 3A:
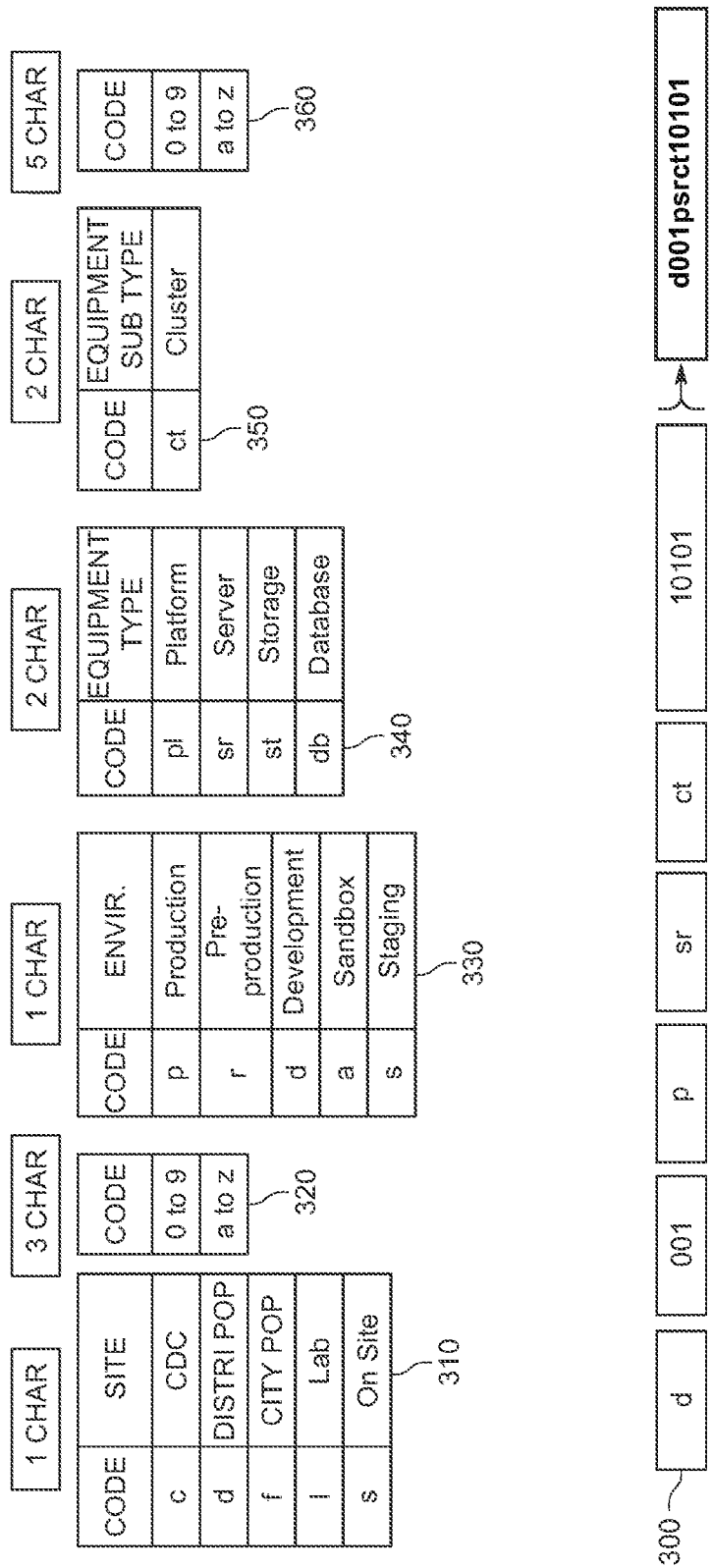
FIG. 3A depicts an illustrative example of a network function identifier generation schema, in accordance with an exemplary embodiment.

In FIG. 3A, the individual codes include: a data center type code 310 reflecting a type of a data center associated with the cluster, a data center identifier code 320 assigned to the specific data center associated with the cluster, an environment type code 330 reflecting a type of the network environment in which the cluster is operating, an equipment type code 340 reflecting a category of the cluster, an equipment subtype code 370 identifying the cluster as a cluster, and an cluster code 390 which is a short code of sufficient length to make the identifier as a whole unique in light of the other codes. In this example, code values of codes 310, 330, 340, and 350 may be determined by a general predefined mapping, the code value of 320 may be determined by a predefined mapping of data centers corresponding to the value of data center type 310, and the code value of 360 may be determined by finding a prior cluster identifier having identical values of the other codes, and incrementing the code value of 360 for that prior cluster identifier by one.

Based on this schema, each code may be determined, and then concatenated in the defined order to generate a complete cluster identifier, an example 300 of which is depicted.

Returning to FIG. 2A, the BMaaS server may register the cluster to the vault at S227. The vault is also granted access to the service account of the cluster, and may store the authentication token of the cluster or otherwise be able to retrieve it from the BMaaS server.

An NF may be registered to the vault at S230. This operation may be repeated for each NF to be onboarded.

Specifically, at S231, an identifier for the NF may be generated. The NF identifier may also be termed a hostname.

The NF identifier may be logically generated based on a schema. For example, the identifier may be a concatenation of alphanumeric codes each indicating a different feature of the NF. Each of the code values may be determined by a predefined mapping of code value to feature value, by applying a function to the feature value, or by other suitable means. An illustrative example of a network function identifier generation schema is depicted in FIG. 3B, although this is just an example and any suitable schema to generate an identifier unique to a specific NF may be used.

Figure 3B:
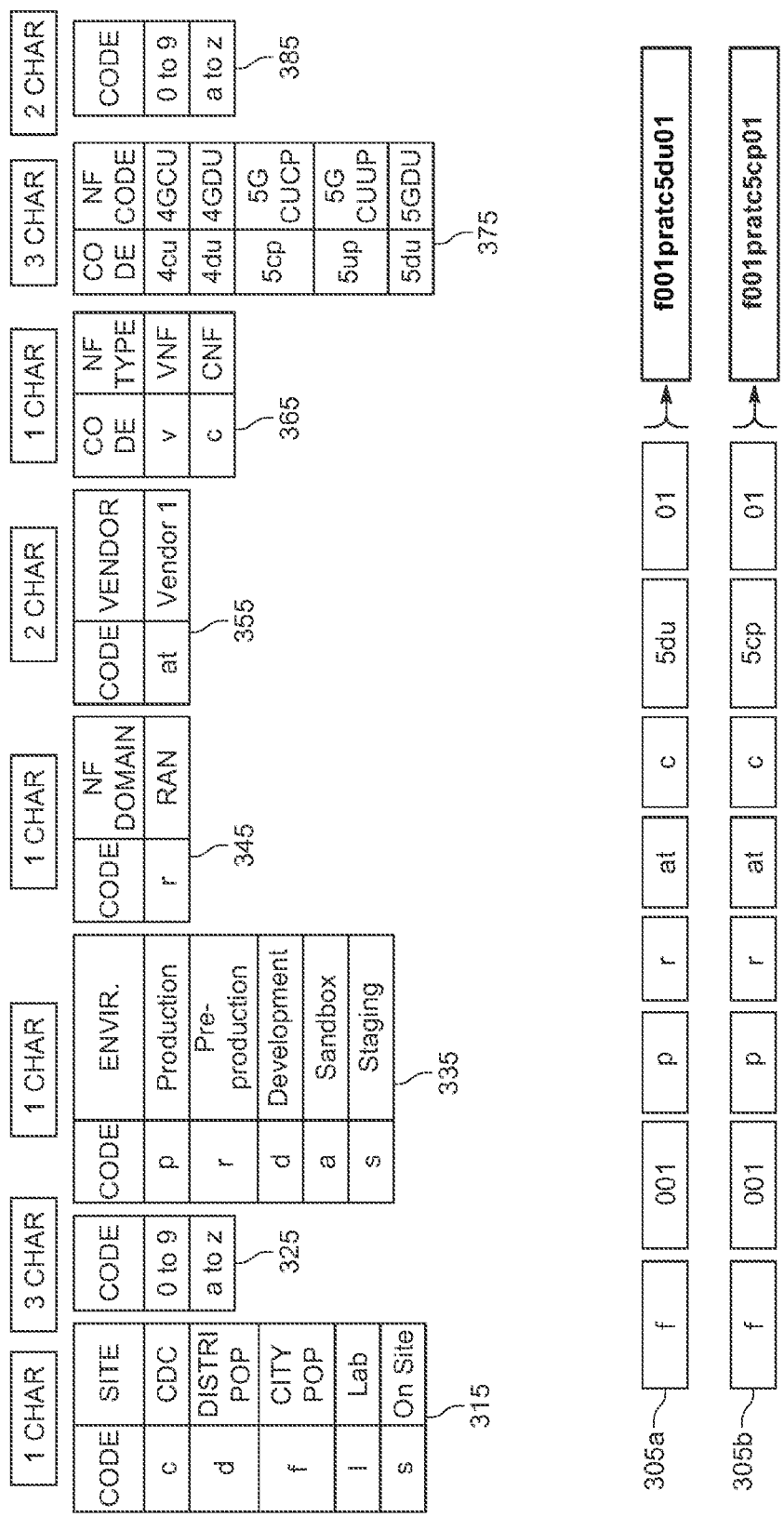
FIG. 3B depicts an illustrative example of a network function identifier generation schema, in accordance with an exemplary embodiment.

In FIG. 3B, the individual codes include: a data center type code 315 reflecting a type of a data center associated with the NF, a data center identifier code 325 assigned to the specific data center associated with the NF, an environment type code 335 reflecting a type of the network environment in which the NF is operating, a domain code 345 reflecting a network domain in which the NF is operating, a vendor identifier code 355 assigned to a vendor for the NF, an NF type code 365 reflecting a type of the NF, a technology code 375 reflecting a technology standard used by the NF, and an NF code 385 which is a short code of sufficient length to make the identifier as a whole unique in light of the other codes. In this example, code values of codes 315 and 335 through 375 may be determined by a general predefined mapping, the code value of 325 may be determined by a predefined mapping of data centers corresponding to the value of data center type 315, and the code value of 385 may be determined by finding a prior NF identifier having identical values of the other codes 315 through 375, and incrementing the code value of 385 for that prior NF identifier by one.

Based on this schema, each code may be determined, and then concatenated in the defined order to generate a complete NF identifier, examples 305a and 305b of which are depicted.

Returning to FIG. 2A, at S233, an initialization parameter set for the NF may be generated and set. The initialization parameter set may include account identifiers of the NF for a corresponding cluster and for the vault, a cluster identifier of the corresponding cluster, the code address for the vault, and an assigned credential address for the vault.

Values for the account identifiers for both the cluster and the vault may be set to be the generated NF identifier or hostname. That is to say, the generated NF identifier may serve as an account name for the NF when accessing an application programming interface (API) associated with the cluster, and may also serve as an account name for the NF when accessing an API associated with the vault.

The value for the cluster identifier may be set to the cluster identifier, generated at S227, of the associated cluster.

The value for the code address of the vault may be set to that address. If the vault is configured in a predefined manner, this address may be derived from the overall address of the vault itself; for example, VAULT_ADDRESS/AuthCode/or similar. Due to the predefined configuration, it may be known that this address exists and contains the authentication code.

If the vault is configured in a predefined manner, the value for the assigned credential address for the NF in the vault may be derived from the overall address of the vault itself and the generated NF identifier; for example, VAULT_ADDRESS/NFCredentials/NF IDENTIFIER or similar. Due to the predefined configuration, it may be known that this address can be generated on the vault within an organization scheme of the vault memory, and will be available to store the credential of the NF due to the uniqueness of the NF identifier.

Other parameters necessary for deployment according to the specific implementation of the system—for example, parameters specific to Kubernetes® clusters—may also be generated at S233.

At S235, the vault may be configured in accordance with the parameter set. The assigned credential address for the NF may be generated in the vault memory, and one or more policies may be set in accordance with the NF to be registered.

At S237, the NF may be registered to the vault in accordance with the parameter set. This may for example include generating an account for the NF, for accessing the vault through a vault API. The account may use the provided account identifier of the NF. The NF may be assigned elevated access permissions to this address, using account parameters. The elevated access permissions may include permissions to create, read, update, and list the contents of the address, or a similarly broad set of access permissions. The NF may also be assigned standard access permissions to the code address. The standard access permissions may include permissions to read and list the contents of the address, or a similarly narrow set of access permissions. A role may also be assigned to the NF.

Continuing to FIG. 2B, the NF may be associated with the cluster on the associated data center server, at S240. This may be termed "deploying the NF onto the cluster."

Then, the credential information for the NF may be generated and stored at S250.

Specifically, at S251, the authentication token for the cluster may be requested from the vault, by sending a token retrieval request. In FIG. 2B, the requesting entity is a certificate management server, which may be, for example, certificate management server 170. However, in other embodiments, the requesting entity may be the NF itself, or the data center server or BMaaS server.

At S253, the authentication token may be received, and may be validated against the cluster information on the data center server, to confirm that the cluster is permitted to access the vault.

At S255, the current authentication code (e.g. an HMAC) may be similarly requested by a code retrieval request, and provided at S257. (It is here assumed that the certificate management server 170 or other requesting entity has at least standard access permissions for the code address.) The certificate management server 170 then may generate a private key for the NF, as well as a certificate signing request (CSR) with an attached unsigned certificate, at S259.

The certificate management server 170 then may send the CSR and the obtained authentication code to the certificate authentication server 140, at S261. If the CSR is valid, the certificate authentication server 140 may sign the attached certificate, "enroll" it on the server (that is, store a copy for reference by other systems seeking to confirm the NF's identity), and return it at S263.

At S265 and S267, the certificate management server 170 may again request, receive, and validate the vault authentication token as before. Then, the certificate management server 170 provides the NF credential—that is, the private key and the signed certificate—to the vault, for storage at the credential address for the NF.

The onboarding is now completed for the NF. Therefore, the NF is enabled to use the authentication features of the system. It is noted before continuing that each of the operations disclosed above does not require manual intervention, but may be completed in an automated fashion.

Figure 2C:
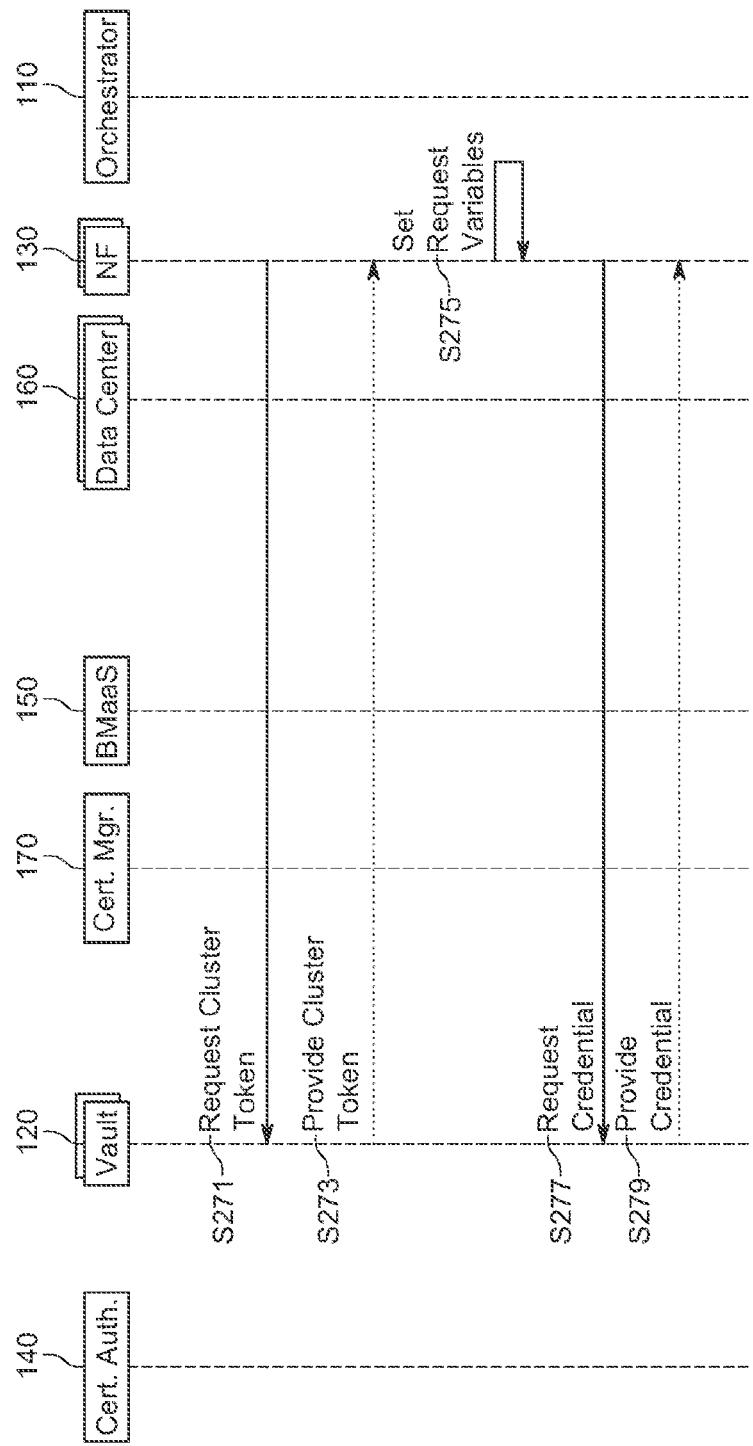
FIG. 2C is a sequence diagram illustrating a process flow for authenticating communication by the credential vault, in accordance with an exemplary embodiment.

FIG. 2C is a sequence diagram illustrating a process flow for authenticating communication by the credential vault, in accordance with an exemplary embodiment.

At S271, the NF may request the authentication token associated with its cluster, which was stored in the vault at S227, and may receive it at S273.

At S275, variable values for a credential retrieval request may be prepared. These may include the credential address in the vault, and the account identifier of the NF at the vault, which are both initialization parameter values for the NF. The credential retrieval request is then sent at S277.

The vault confirms that the NF has access permissions to the designated credential address, based on the account identifier identifying the registered account for the NF. Then the vault provides the credential stored at the credential address, at S279. The NF is now enabled to use the credential or the elements thereof for secure communication and authentication.

It is noted that the operations disclosed above provide secure communication from the NF, by the credential vault and other components configured in accordance with the method of FIGS. 2A and 2B.

These and related processes, and other necessary instructions, may be encoded as executable instructions on one or more non-transitory computer-readable media, such as hard disc drives or optical discs, and executed using one or more computer processors, in concert with an operating system or other suitable measures. Likewise, one or more of the above components described above may be implemented as instructions stored on a computer-readable storage medium and executable by at least one processor (and/or may include at least one processor).

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

In a software implementation, the software may include a plurality of computer executable instructions, to be implemented on a computer system. Prior to loading in a computer system, the software may reside as encoded information on a suitable tangible, non-transitory, computer-readable storage medium, such as magnetically, optically, or other suitably encoded or recorded media. The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing, In certain embodiments, the computer-readable storage medium may take the form of pre-existing data storage (such as "cloud storage") accessible through an operably coupled network means (such as the Internet). A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar. The computer-readable program instructions may execute entirely on a user's computer, partly on the user's computer, as a stand-alone software package, partly on the user's computer and partly on a remote computer or server, or entirely on the remote computer or server. In scenarios involving a remote computer or server, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects or operations.

In certain implementations, a system includes a dedicated processor or processing portions of a system on chip (SOC), portions of a field programmable gate array (FPGA), or other such suitable measures, executing processor instructions for performing the functions described herein or emulating certain structures defined herein. Suitable circuits using, for example, discrete logic gates such as in an Application Specific Integrated Circuit (ASIC), Programmable Logic Array (PLA), or Field Programmable Gate Arrays (FPGA) are in certain embodiments also developed to perform these functions.

Figure 4:
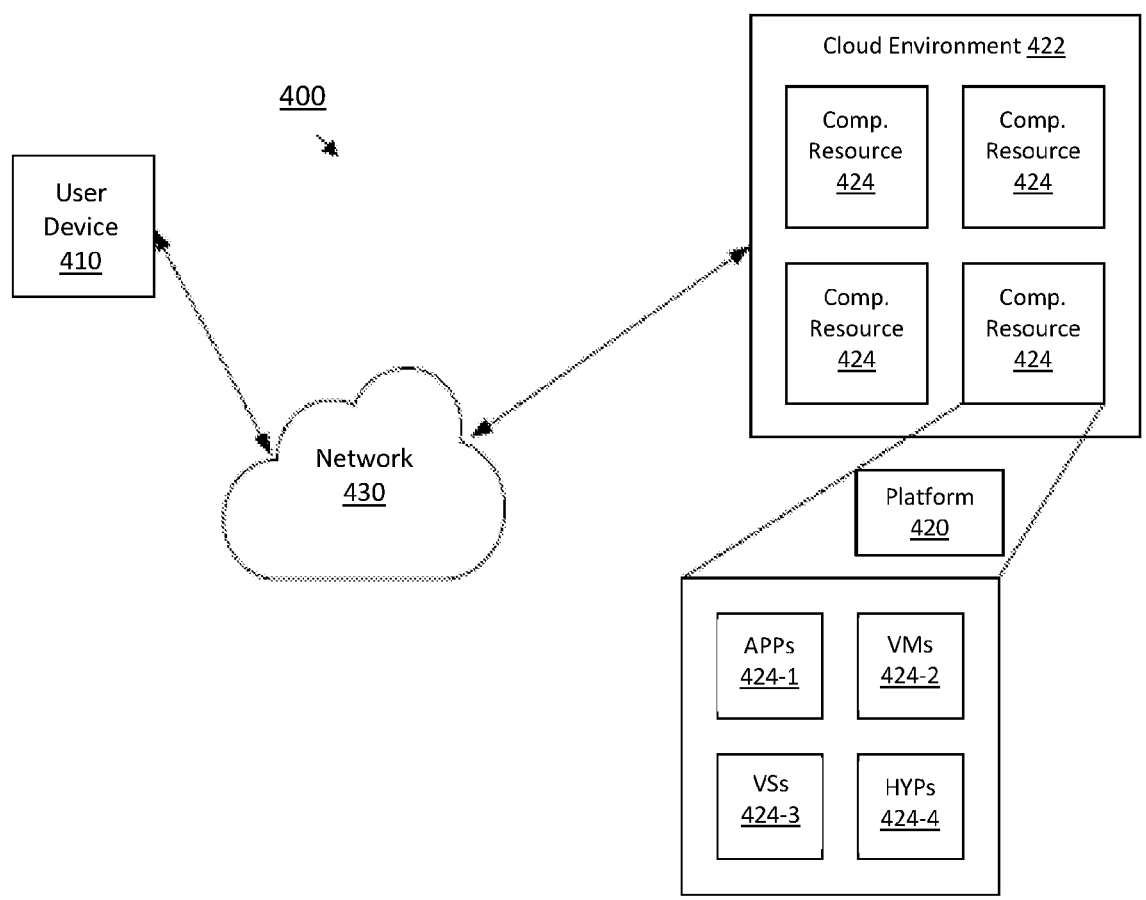
FIG. 4 is a diagram of an example environment in which embodiments of the systems and/or methods described herein may be implemented.

FIG. 4 is a diagram of an example environment 400 in which systems and/or methods, described herein, may be implemented. As shown in FIG. 4, environment 400 may include a user device 410, a platform 420, and a network 430. Devices of environment 400 may interconnect via wired connections, wireless connections, or a combination of wired and wireless connections. In embodiments, any of the functions and operations described with reference to FIGS. 2A, 2B, and 2C above may be performed by any combination of elements illustrated in FIG. 4.

User device 410 includes one or more devices capable of receiving, generating, storing, processing, and/or providing information associated with platform 420. For example, user device 410 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 410 may receive information from and/or transmit information to platform 420.

Platform 420 includes one or more devices capable of receiving, generating, storing, processing, and/or providing information. In some implementations, platform 420 may include a cloud server or a group of cloud servers. In some implementations, platform 420 may be designed to be modular such that certain software components may be swapped in or out depending on a particular need. As such, platform 420 may be easily and/or quickly reconfigured for different uses.

In some implementations, as shown, platform 420 may be hosted in cloud computing environment 422. Notably, while implementations described herein describe platform 420 as being hosted in cloud computing environment 422, in some implementations, platform 420 may not be cloud-based (i.e., may be implemented outside of a cloud computing environment) or may be partially cloud-based.

Cloud computing environment 422 includes an environment that hosts platform 420. Cloud computing environment 422 may provide computation, software, data access, storage, etc., services that do not require end-user (e.g., user device 410) knowledge of a physical address and configuration of system(s) and/or device(s) that hosts platform 420. As shown, cloud computing environment 422 may include a group of computing resources 424 (referred to collectively as "computing resources 424" and individually as "computing resource 424").

Computing resource 424 includes one or more personal computers, a cluster of computing devices, workstation computers, server devices, or other types of computation and/or communication devices. In some implementations, computing resource 424 may host platform 420. The cloud resources may include compute instances executing in computing resource 424, storage devices provided in computing resource 424, data transfer devices provided by computing resource 424, etc. In some implementations, computing resource 424 may communicate with other computing resources 424 via wired connections, wireless connections, or a combination of wired and wireless connections.

As further shown in FIG. 4, computing resource 424 includes a group of cloud resources, such as one or more applications ("APPs") 424-1, one or more virtual machines ("VMs") 424-2, virtualized storage ("VSs") 424-3, one or more hypervisors ("HYPs") 424-4, or the like.

Application 424-1 includes one or more software applications that may be provided to or accessed by user device 410. Application 424-1 may eliminate a need to install and execute the software applications on user device 410. For example, application 424-1 may include software associated with platform 420 and/or any other software capable of being provided via cloud computing environment 422. In some implementations, one application 424-1 may send/receive information to/from one or more other applications 424-1, via virtual machine 424-2.

Virtual machine 424-2 includes a software implementation of a machine (e.g., a computer) that executes programs like a physical machine. Virtual machine 424-2 may be either a system virtual machine or a process virtual machine, depending upon use and degree of correspondence to any real machine by virtual machine 424-2. A system virtual machine may provide a complete system platform that supports execution of a complete operating system ("OS"). A process virtual machine may execute a single program, and may support a single process. In some implementations, virtual machine 424-2 may execute on behalf of a user (e.g., user device 410), and may manage infrastructure of cloud computing environment 422, such as data management, synchronization, or long-duration data transfers.

Virtualized storage 424-3 includes one or more storage systems and/or one or more devices that use virtualization techniques within the storage systems or devices of computing resource 424. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a address where files are physically stored. This may enable optimization of storage use, server consolidation, and/or performance of non-disruptive file migrations.

Hypervisor 424-4 may provide hardware virtualization techniques that allow multiple operating systems (e.g., "guest operating systems") to execute concurrently on a host computer, such as computing resource 424. Hypervisor 424-4 may present a virtual operating platform to the guest operating systems, and may manage the execution of the guest operating systems. Multiple instances of a variety of operating systems may share virtualized hardware resources.

Network 430 includes one or more wired and/or wireless networks. For example, network 430 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
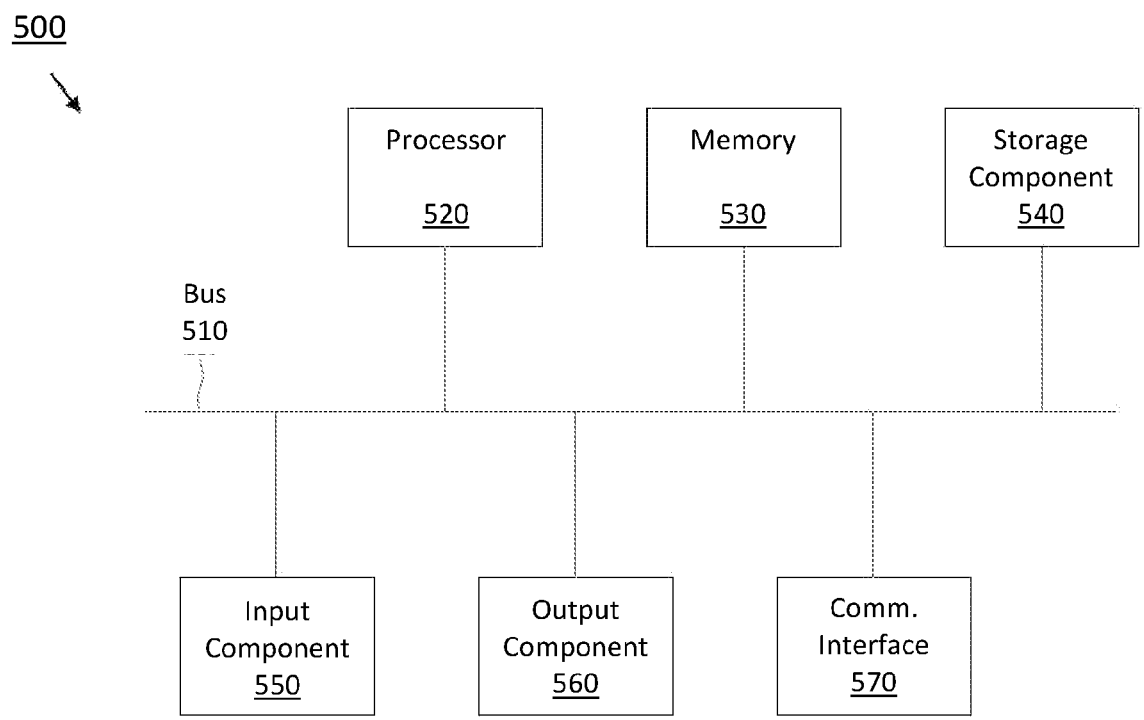
FIG. 5 is a diagram of example components of a device on which embodiments of the systems and/or methods described herein may be implemented.

FIG. 5 is a diagram of example components of a device 500. Device 500 may correspond to user device 410 and/or platform 420, as well as any of orchestrator 110, credential vault 120, network functions (NFs) 130, certificate authentication server 140, Bare-Metal-as-a-Service (BMaaS) server 150, data center server 160, and/or certificate management server 170. As shown in FIG. 5, device 500 may include a bus 510, a processor 520, a memory 530, a storage component 540, an input component 550, an output component 560, and a communication interface 570.

Bus 510 includes a component that permits communication among the components of device 500. Processor 520 may be implemented in hardware, firmware, or a combination of hardware and software. Processor 520 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 includes one or more processors capable of being programmed to perform a function. Memory 530 includes a random access memory (RAM), a read only memory (ROM), and/or another type of dynamic or static storage device (e.g., a flash memory, a magnetic memory, and/or an optical memory) that stores information and/or instructions for use by processor 520.

Storage component 540 stores information and/or software related to the operation and use of device 500. For example, storage component 540 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 550 includes a component that permits device 500 to receive information, such as via user input (e.g., a touch screen display, a keyboard, a keypad, a mouse, a button, a switch, and/or a microphone). Additionally, or alternatively, input component 550 may include a sensor for sensing information (e.g., a global positioning system (GPS) component, an accelerometer, a gyroscope, and/or an actuator). Output component 560 includes a component that provides output information from device 500 (e.g., a display, a speaker, and/or one or more light-emitting diodes (LEDs)).

Communication interface 570 includes a transceiver-like component (e.g., a transceiver and/or a separate receiver and transmitter) that enables device 500 to communicate with other devices, such as via a wired connection, a wireless connection, or a combination of wired and wireless connections. Communication interface 570 may permit device 500 to receive information from another device and/or provide information to another device. For example, communication interface 570 may include an Ethernet interface, an optical interface, a coaxial interface, an infrared interface, a radio frequency (RF) interface, a universal serial bus (USB) interface, a Wi-Fi interface, a cellular network interface, or the like.

Device 500 may perform one or more processes described herein. Device 500 may perform these processes in response to processor 520 executing software instructions stored by a non-transitory computer-readable medium, such as memory 530 and/or storage component 540. A computer-readable medium is defined herein as a non-transitory memory device. A memory device includes memory space within a single physical storage device or memory space spread across multiple physical storage devices.

Software instructions may be read into memory 530 and/or storage component 540 from another computer-readable medium or from another device via communication interface 570. When executed, software instructions stored in memory 530 and/or storage component 540 may cause processor 520 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

In embodiments, any one of the operations or processes of FIGS. 2A, 2B, and 2C may be implemented by or using any one of the elements illustrated in FIG. 5.

The foregoing disclosure provides illustration and description, but is not intended to be exhaustive or to limit the implementations to the precise form disclosed. Modifications and variations are possible in light of the above disclosure or may be acquired from practice of the implementations.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method for onboarding of network functions to a credential vault, the credential vault including a vault memory and a vault processor, the vault memory storing an authentication code at a code address thereof, the method comprising, by at least one processor:
   actuating establishment of an cluster account for a network cluster;
   actuating a cluster configuration of the vault processor to enable authentication of the network cluster; and
   for each network function of a plurality of network functions associated with the network cluster:
      generating an identifier for the network function,
      setting values for parameters of an initialization parameter set for the network function, the initialization parameter set including a credential address in the vault memory for storage of a credential for the network function, a value of the credential address being based on the generated identifier for the network function,
      actuating assignment of access permissions to the network function for the code address on the vault memory,
      actuating assignment of elevated access permissions to the network function for the credential address on the vault memory, and
      actuating association of the network function with the cluster account of the network cluster;
   the vault memory thereby defining a plurality of credential addresses each corresponding to a respective one of the plurality of network functions,
   wherein the vault processor is configured to:
      provide, based on receipt of a code retrieval request identifying the code address from a device having access permissions thereto, the authentication code,
      store at a selected credential address, based on receipt of a credential storage request providing a credential and identifying the selected credential address from a device having elevated access permissions thereto, the provided credential, and provide, based on receipt of a credential retrieval request identifying the selected credential address from a device having elevated access permissions thereto, the credential stored at the selected credential address.

2. The method of claim 1, wherein the initialization parameter set further includes an identifier for the associated cluster, an account identifier of the network function for the associated cluster, an account identifier of the network function for the credential vault, and the code address in the vault memory.

3. The method of claim 2, wherein the values for the account identifier of the network function for the associated cluster and the account identifier of the network function for the credential vault are based on the generated identifier for the network function.

4. The method of claim 1, wherein the identifier for the network function is generated based on a concatenation of values reflecting features of the network function.

5. The method of claim 1,
wherein an authentication processor is configured to provide, based on receipt of a signature request including the authentication code, a signed authentication certificate, and
wherein the credential includes a private key and the signed authentication certificate.

6. The method of claim 5,
wherein the cluster configuration of the vault processor includes establishing access of an authentication token for the network cluster to the vault processor, and
wherein the signature request further includes the authentication token for the network cluster.

7. A non-transitory computer-readable recording medium having recorded thereon instructions executable by at least one processor to perform a method for onboarding of network functions to a credential vault, the credential vault comprising a vault memory and a vault processor, the vault memory storing an authentication code at a code address thereof, the method comprising:
actuating establishment of an cluster account for a network cluster;
actuating a cluster configuration of the vault processor to enable authentication of the network cluster; and
for each network function of a plurality of network functions associated with the network cluster:
generating an identifier for the network function,
setting values for parameters of an initialization parameter set for the network function, the initialization parameter set including a credential address in the vault memory for storage of a credential for the network function, a value of the credential address being based on the generated identifier for the network function,
actuating assignment of access permissions to the network function for the code address on the vault memory,
actuating assignment of elevated access permissions to the network function for the credential address on the vault memory, and
actuating association of the network function with the cluster account of the network cluster;
the vault memory thereby defining a plurality of credential addresses each corresponding to a respective one of the plurality of network functions,
wherein the vault processor is configured to:
provide, based on receipt of a code retrieval request identifying the code address from a device having access permissions thereto, the authentication code,
store at a selected credential address, based on receipt of a credential storage request providing a credential and identifying the selected credential address from a device having elevated access permissions thereto, the provided credential, and
provide, based on receipt of a credential retrieval request identifying the selected credential address from a device having elevated access permissions thereto, the credential stored at the selected credential address.

8. The recording medium of claim 7, wherein the initialization parameter set further includes an identifier for the associated cluster, an account identifier of the network function for the associated cluster, an account identifier of the network function for the credential vault, and the code address in the vault memory.

9. The recording medium of claim 8, wherein the values for the account identifier of the network function for the associated cluster and the account identifier of the network function for the credential vault are based on the generated identifier for the network function.

10. The recording medium of claim 7, wherein the identifier for the network function is generated based on a concatenation of values reflecting features of the network function.

11. The recording medium of claim 7,
wherein an authentication processor is configured to provide, based on receipt of a signature request including the authentication code, a signed authentication certificate, and
wherein the credential includes a private key and the signed authentication certificate.

12. The recording medium of claim 11,
wherein the cluster configuration of the vault processor includes establishing access of an authentication token for the network cluster to the vault processor, and
wherein the signature request further includes the authentication token for the network cluster.

13. A system for onboarding of network functions to a credential vault, the system comprising:
an orchestrator, comprising at least one orchestration processor; and
the credential vault, comprising a vault memory and at least one vault processor,
wherein the vault memory stores an authentication code at a code address thereof,
wherein the at least one orchestration processor is configured to:
actuate establishment of an cluster account for a network cluster;
actuate a cluster configuration of the at least one vault processor to enable authentication of the network cluster; and
for each network function of a plurality of network functions associated with the network cluster:
generate an identifier for the network function,
set values for parameters of an initialization parameter set for the network function, the initialization parameter set including a credential address in the vault memory for storage of a credential for the network function, a value of the credential address being based on the generated identifier for the network function, actuate assignment of access permissions to the network function for the code address on the vault memory, actuate assignment of elevated access permissions to the network function for the credential address on the vault memory, and actuate association of the network function with the cluster account of the network cluster;

the vault memory thereby defining a plurality of credential addresses each corresponding to a respective one of the plurality of network functions, wherein the at least one vault processor is configured to:

provide, based on receipt of a code retrieval request identifying the code address from a device having access permissions thereto, the authentication code, store at a selected credential address, based on receipt of a credential storage request providing a credential and identifying the selected credential address from a device having elevated access permissions thereto, the provided credential, and provide, based on receipt of a credential retrieval request identifying the selected credential address from a device having elevated access permissions thereto, the credential stored at the selected credential address.

14. The system of claim 13, wherein the initialization parameter set further includes an identifier for the associated cluster, an account identifier of the network function for the associated cluster, an account identifier of the network function for the credential vault, and the code address in the vault memory.

15. The system of claim 14, wherein the values for the account identifier of the network function for the associated cluster and the account identifier of the network function for the credential vault are based on the generated identifier for the network function.

16. The system of claim 13, wherein the identifier for the network function is generated based on a concatenation of values reflecting features of the network function.

17. The system of claim 13, further comprising an authentication server, the authentication server comprising at least one authentication processor configured to provide, based on receipt of a signature request including the authentication code, a signed authentication certificate, wherein the credential includes a private key and the signed authentication certificate.

18. The system of claim 17, wherein the cluster configuration of the at least one vault processor includes establishing access of an authentication token for the network cluster to the at least one vault processor, and wherein the signature request further includes the authentication token for the network cluster.

* * * * *